United States Patent [19]

Hoover

[11] 4,069,034

[45] Jan. 17, 1978

[54] SUSPENSION FERTILIZERS AND METHOD OF PRODUCING SAME

[75] Inventor: Lonnie Daniel Hoover, Chappell Hill, Tex.

[73] Assignee: N L Industries, Inc., New York, N.Y.

[21] Appl. No.: 635,129

[22] Filed: Nov. 25, 1975

[51] Int. Cl.$^2$ ............................................. C05B 7/00
[52] U.S. Cl. ......................................... 71/33; 71/24; 71/64 C; 71/64 G; 252/352; 23/300
[58] Field of Search ................. 23/272 AH, 293, 300; 71/24, 64 C, 64 G, 33, 35, DIG. 1; 210/58; 252/180, 315, 352

[56] References Cited

U.S. PATENT DOCUMENTS

| | | | |
|---|---|---|---|
| 1,607,666 | 11/1926 | De Haën | 71/33 |
| 3,114,625 | 12/1963 | Higuchi et al. | 71/24 X |
| 3,676,101 | 7/1972 | Nix | 71/64 C X |
| 3,813,233 | 5/1974 | Kendrick, Jr. | 71/64 C X |

FOREIGN PATENT DOCUMENTS

| | | | |
|---|---|---|---|
| 252,357 | 3/1970 | U.S.S.R. | 71/24 |
| 429,047 | 10/1974 | U.S.S.R. | 71/33 |
| 359,247 | 1/1973 | U.S.S.R. | 71/33 |

*Primary Examiner*—Thomas G. Wyse
*Assistant Examiner*—Ferris H. Lander

[57] ABSTRACT

Suspension fertilizers containing humic acid as a crystallization inhibitor and crystal growth modifier. Suspension fertilizers containing from 0.05% to 3% humic acid and from 0.25%-3% bentonite have excellent stability as evidenced by a low concentration of crystals, a low crystal growth rate, good suspension characteristics and good rheological properties. An improved method of manufacturing suspension fertilizers which consists of adding from 0.05% to 3% by weight humic acid to the suspension fertilizer, and a method of inhibiting the formation and growth of crystals from a supersaturated solution of at least one fertilizer chemical which comprises adding from 0.05% to 3% by weight humic acid to the solution before it becomes supersaturated.

36 Claims, No Drawings

SUSPENSION FERTILIZERS AND METHOD OF PRODUCING SAME

BACKGROUND OF THE INVENTION

This invention relates to novel suspension (slurry) fertilizer compositions and their method of manufacture.

PRIOR ART

Suspension fertilizers, sometimes called slurries, are well known and consist of saturated solutions of certain fertilizer chemicals in which part of the total chemical nutrients are present as minute, finely divided crystals. Such suspension fertilizers are prepared from supersaturated solutions of the fertilizer chemicals from which the chemicals crystallize. See, for example, the following references: Slack et al. U.S. Pat. No. 3,109,729; Slack et al. U.S. Pat. No. 3,113,858; Walters U.S. Pat. No. 3,326,666; Philen et al. U.S. Pat. No. 3,526,495; Gerhardt et al. U.S. Pat. No. 3,676,100; Nix U.S. Pat. No. 3,676,101; Jones et al. U.S. Pat. No. 3,697,247; "Chemistry and Technology of Fertilizers," A. V. Slack. 1966, 1967, Interscience Publishers, John Wiley & Sons, Inc.. New York, N.Y., pp. 128–129; "Production and Use of Fluid Fertilizers Made with Wet-Process Superphosphoric Acid," W. C. Scott, J. A. Wilbanks and M. R. Burns, Fertilizer Solutions, July–August, 1968; "New Advances in Liquid Fertilizers," J. M. Potts. Fertilizer Solutions, March–April, 1963; "Suspension Fertilizers," J. Silverberg. Commercial Fertilizer and Plant Food Industry, August, 1966; "Small-Scale Studies of Properties of Suspension Fertilizers from Electric-Furnace Superphosphoric Acid," T. M. Jones and J. G. Getsinger. Fertilizer Solutions, May–June, 1970.

The main problems in making and using suspension fertilizers are settling of solids and growth of crystals. Settled solids are difficult to redisperse and make it difficult to remove the product from its container. This is especially true of solids that are crystals of soluble salts since they may pack to form a hard cake on the bottom of the storage vessel. Growth of crystals may cause stoppage of spray nozzles in application and may cause settling of the crystals.

These problems have been reduced by the use of a suspending agent such as attapulgite or bentonite clay. Addition of 1 to 3% of clay increases the viscosity, delays settling and crystal growth, and keeps the solids from forming a hard cake when settling eventually occurs. If suspensions are applied to the field immediately after preparation, no particular care is required in regard to settling. However, if they are stored or if some delay occurs between preparation and application, provision must be made for redispersion of the solids. This is accomplished either by mechanical stirring, by air sparging, or by recirculating with a pump.

Suspension fertilizers are usually produced from wet-process phosphoric acid (WPPA) by a two-stage ammoniation process. In the first stage the WPPA is ammoniated to pH 4(70–75% of the required $NH_3$ for a 12-40-0 grade suspension fertilizer) with retention for about 30 minutes or longer at boiling (225° F). Operation at boiling results in dissipation of the heat of reaction through evaporative cooling. No loss of $NH_3$ occurs at this pH. In the second stage the ammoniation is completed to pH 5.9 with external cooling to 60°–180° F and retention for about 10 minutes. Thereafter the product from the second stage is rapidly cooled to 140° F and the suspending clay added. The rapid cooling causes many very small crystals of monoammonium phosphate and/or diammonium phosphate to form rather than fewer large crystals. The two-stage process gives improved results over single-stage ammoniation processes, presumably because the metallic impurities present in the WPPA are precipitated as crystalline compounds under the conditions of operation in the first stage rather than as amorphous gel-like materials formed in single-stage ammoniation processes.

Suspension fertilizers can also be prepared from triple superphosphate, nitric phosphate suspensions, wet-process superphosphoric acid and electric furnace superphosphoric acid. Suspensions containing potash are best prepared from the concentrated suspensions containing only phosphorus and/or nitrogen, such as 13-43-0, 12-40-0, 11-45-0, 13-41-0, 14-44-0, 14-47-0, 14-42-0, 37-0-0, by adding solid potassium chloride of small particle size to the suspensions or mixtures of the suspensions only after the suspensions have cooled, preferably to room temperature. This prevents undue dissolution of the solid and subsequent recrystallization which is likely to result in the formation of large crystals.

Gelled ammonia solutions are disclosed in Smith and Sawyer U.S. Pat. No. 3,148,970.

Humic acid containing materials, such as lignite and leonardite (the richest common source of humic acid), have been proposed for use as fertilizer ingredients. See for example the following references: Karcher U.S. Pat. 3,264,084; "Humic Acids from Leonardite—A Soil Conditioner and Organic Fertilizer." C. M. Frost and R. W. Youngs. Am. Chem. Soc., Div. Fuel Chem., Preprints 7(1), pp. 12–17 (1963); "The Characteristics and Effects of Humic Acids Derived from Leonardite." J. B. Aitken, B. Accock and T. L. Senn. 1964. South Carolina Agricultural Experiment Station Technical Bulletin 1015; "The Chemical Nature of the Carboxyl Groups of Humic Acids and Conversion of Humic Acids to Ammonium Nitrohumates." D. Schwartz, L. Asfeld and R. Green. Fuel, Vol. 44, No. 6, pp. 417–424(1965); "Soil Organic Matter—Its Nature, Its Role in Soil Formation and In Soil Fertility." M. M. Kononova. 1961. Pergamon Press, New York, N.Y. A reference which describes the characteristics and properties of humic acids is the following: "Leonardite: A Lignite By-Product," W. W. Fowkes and C. M. Frost. U.S. Dept. of Interior, Bureau of Mines Report No. 5611 (1960).

SUMMARY OF THE INVENTION

I have now found humic acid prevents or delays the crystallization of fertilizer chemicals from supersaturated solutions of such chemicals, and that humic acid retards the growth of any crystals so formed, i.e., humic acid decreases the growth rate of crystals of such fertilizer chemicals. The humic acid also acts as a colloid which enhances the suspension of the crystals and which promotes the suspension characteristics of clays incorporated into the suspension fertilizer.

PREFERRED EMBODIMENTS OF THE INVENTION

The novel method of this invention for producing suspension fertilizers is accomplished by adding a crystal modifying amount of humic acid to a solution containing at least one fertilizer chemical, preferably before the solution becomes supersaturated with the chemical. There is preferably added from 0.05% to 3% by weight humic acid, more preferably 0.1% to 3% by weight, based on the weight of the suspension fertilizer. The presence of the humic acid in the solution prevents or delays the crystallization of fertilizer chemicals from supersaturated solutions of such chemicals and retards the growth during long storage or upon storage under adverse temperature conditions of the crystals which form. Addition of humic acid to the solution before the solution becomes supersaturated enables the humic acid to provide its full effect is preventing or delaying the crystallization of the fertilizer chemicals from the supersaturated solution. This crystal inhibiting effect of the humic acid is decreased if the humic acid is added after the solution becomes supersaturated since the nuclei of many crystals may already have formed when the humic acid is added. However, when added after the solution becomes supersaturated the humic acid will decrease the crystal growth rate and hence retard the growth of any crystals which form. The presence of minute crystals is necessary in some suspension fertilizers (see U.S. Pat. No. 3,526,495 and U.S. Pat. No. 3,676,101).

Minute crystals of fertilizer chemicals are present in all suspension fertilizers. However, using the processes and compositions of the present invention, there are provided suspension fertilizers which have excellent stability in which the growth rate of the crystals is minimized or eliminated, the settling tendency of the suspensions is minimized or eliminated, and desirable flow properties are maintained on prolonged storage.

The term "humic acid" used in describing my invention is intended to include not only "pure" humic acid, but is intended also to include: alkali metal and ammonium salts of humic acid (alkali metal and ammonium humates); materials which contain appreciable quantities of humic acid such as lignite, leonardite, and marine sediments; materials which contain alkali metal or ammonium salts of humic acid such as lignite and leonardite reacted with alkali metal or ammonium hydroxides; derivatives of humic acid or such humic acid containing materials including nitrohumic acid, nitrohumates, sulfonated humic acid, sulfonated humates, oxidized lignite and the like; and mixtures of any of these forms of humic acid. Accordingly the percentages of humic acid disclosed and claimed herein are the percentages of all such humic acid containing materials.

The humic acid useful in this invention may be "pure" humic acid obtained by extracting humic acid from natural humic acid containing materials such as lignite, leonardite (an oxidized form of lignite containing a greater concentration of humic acid than lignite) and peat. Humic acid can be extracted by forming a slurry of the humic acid containing material in water, solubilizing the humic acid forming a humate salt by additng a basic alkali metal or ammonium compound such as a carbonate or hydroxide, preferably potassium hydroxide and/or ammonium hydroxide, and removing the insoluble, non-dispersible, non-humic acid impurities by settling and decantation, centrifugation, filtration or other means known to those skilled in the art. This purified slurry of alkali metal of ammonium humate can be used in the process of my invention. Alternatively the solution of the humate salt can be dried, such as by spray drying, to provide a solid alkali metal or ammonium humate which is useful in my invention. The purified slurry of an alkali metal or ammonium humate can be acidified, preferably to a pH less than 6, to form humic acid which can then be separated from the slurry, such as by filtration, and dried to provide a solid humic acid useful in the process of my invention.

Methods for extracting humic acid from humic acid containing materials, particularly leonardite, with phosphoric acid and ammonia are given in Karcher et al. U.S. Pat. No. 3,111,404 and Karcher U.S. Pat. No. 3,264,084, each incorporated herein by reference. The ammonium humates provided by these processes can be used as either the dry solid provided by the processes or, preferably, as a colloidally dispersed ammonium humate solution.

Preferably the humic acid is used in the processes and suspension fertilizers of my invention. in the form of lignite or leonardite or the reaction product of lignite or leonardite with potassium hydroxide or ammonium hydroxide. Still more preferably the source of the humic acid is leonardite or the reaction product of leonardite with ammonium hydroxide.

The suspension fertilizers of my invention preferably contain a clay to increase the viscosity of the suspension in order to prevent settling and separation of impurities and crystalline solids from the suspensions on long standing. Preferred is the use of pre-hydrated sodium bentonite, such as that from Wyoming, although any clay which increases the viscosity and gel strength of suspension fertilizers can be used. An excellent method of prehydrating bentonite is disclosed in Pippen U.S. Pat. No. 3,691,070, incorporated herein by reference. The clay may be added at any stage in the process.

The viscosity of the suspension fertilizers of this invention increases as the pH of the suspension is raised above approximately 4.5. The viscosity attained by the suspension at any given pH increases as the humic acid content of the suspension increases. Proper adjustment of the humic acid content and pH of the suspension thus enables suspension fertilizers to be prepared which have excellent flow properties and antisettling characteristics which need no clay or other viscosifier. In those cases where changes in the composition of the phosphoric acid or process changes affect the stability of the suspension, some clay may be needed which will be much less than that required at lower pH.

The suspension fertilizers can be prepared by any of the prior art methods, such as those disclosed in Newsom U.S. Pat. No. 3,096,170; Slack et al U.S. Pat. No. 3,109,729; Slack et al U.S. Pat. No. 3,113,858; Smith et al U.S. Pat. No. 3,234,004; Walters U.S. Pat. 3,326,666; Philen et al U.S. Pat. No. 3,526,495; Gerhardt et al U.S. Pat. No. 3,676,100; Nix U.S. Pat. No. 3,676,101; Jones et al U.S. Pat. No. 3,697,247; and Kendrick U.S. Pat. No. 3,813,233, all incorporated herein by reference, provided that such processes include the step of incorporating into the suspension fertilizer a crystal modifying amount of humic acid, preferably from 0.05% to 3% by weight based on the final weight of the suspension fertilizer, more preferably from 0.1% to 3%.

In those processes for producing suspension fertilizers by reacting an ammoniating fluid with phosphoric acid (or polyphosphoric acid), the clay is preferably added after all of the ammoniating fluid and phosphoric acid have been added to he reaction vessel. In a continuous reaction process for preparing suspension fertilizers from ammoniating fluid and phosphoric acid, it is preferred to add the clay and humic acid together as a pumpable slurry of the clay and either ammonium humate or potassium humate, preferably ammonium humate, concurrently with the ammoniating fluid and phosphoric acid, each at a rate to produce a suspension fertilizer containing the desired pH and concentrations of nitrogen, phosphorus, clay/and or humic acid.

When the phosphoric acid used to prepare the suspension fertilizer contains less than about 78% $P_2O_5$, the major crystallizing phase at a pH less than 5.8 is $NH_4H_2PO_4$, whereas at a pH greater than 5.8 the major crystallizing phase is $(NH_4)_2HPO_4$. With phosphoric acid containing greater than about 78% $P_2O_5$, the major crystallizing phase at a pH less than 6.1 is $(NH_4)_3HP_2O_7$, whereas at a pH greater than 6.1 the major crystallizing phase is $(NH_4)_4P_2O_7$. With phosphoric acid containing about 78% $P_2O_5$ both orthophosphate and pyrophosphate crystals may be present in the suspension.

The invention also encompasses a method of inhibiting the formation and growth of crystals from a supersaturated solution of at least one fertilizer chemical which comprises adding to the solution a crystal modifying amount of humic acid, preferably from 0.05% to 3% by weight based on the final weight of the composition, still more preferably from 0.1% to 3% humic acid. Addition of the humic acid to the solution before the solution becomes supersaturated enables the humic acid to provide maximum effectiveness in inhibiting the formation of crystals. Addition of the humic acid to the supersaturated solution decreases the effectiveness of the humic acid in preventing the formation of crystals since many small crystal nuclei may have already been formed at the time the humic acid is added, however, the humic acid will decrease the growth rate of the crystals which is also desirable.

Addition of a crystal modifying amount of humic acid and from 0.25% to 3% by weight clay, preferably bentonite, to a solution which is or which subsequently becomes supersaturated with at least one fertilizer chemical provides a method of inhibiting the formation and growth of crystals of the fertilizer chemical and of preventing the settling of any crystals which are formed. Preferably there is added from 0.1% to 3% humic acid and from 0.25% to 3% sodium bentonite.

The preferred suspension fertilizers of this invention contain water, at least one nitrogen containing compound to provide at least 10% nitrogen by weight in the suspension, at least one phosphorus containing compound to provide at least 35% $P_2O_5$ by weight in the suspension, and from 0.05% to 3% humic acid by weight, still more preferably from 0.1% to 3% humic acid. Typical suspension fertilizers contain from 11% to 15% nitrogen and from 38% to 47% $P_2O_5$, such as the following percentages of nitrogen and $P_2O_5$, respectively: 13-43; 12-40; 11-45; 13-41; 14-44; 14-47; 14-42; 12-38; 13-39; 15-45.

Preferred nitrogen and phosphorus containing compounds are selected from the group consisting of $NH_4H_2PO_4$, $(NH_4)_2HPO_4$, $(NH_4)_3P_2O_7$, $(NH_4)_4P_2O_7$, and mixtures thereof.

Such suspension fertilizers containing high concentrations of nitrogen and phosphorus are convenient to transport and store, and are used as concentrates to prepare suspension fertilizers containing various quantities of nitrogen, phosphorus, and potassium. These suspensions contain water, at least one nitrogen containing compound to provide at least 8% nitrogen by weight in the suspension, at least one phosphorus containing compound to provide at least 12% $P_2O_5$ by weight in the suspension, at least one potassium compound to provide at least 7% by weight $K_2O$ in the suspension, and from 0.05% to 3% humic acid by weight, preferably 0.1% to 3% humic acid. Suspension fertilizers of this type typically contain from 8% to 21% nitrogen, from 12% to 30% $P_2O_5$, and from 7% to 27% by weight $K_2O$, such as the following percentages of nitrogen, $P_2O_5$, and $K_2O$, respectively: 8-16-16; 9-18-27; 10-30-10; 10-20-20; 12-12-12; 12-24-12; 15-15-15; 16-16-8; 21-14-7.

These suspension fertilizers containing nitrogen, phosphorus and potassium are prepared from the suspensions containing at least 10% nitrogen and at least 35% $P_2O_5$ by adding to the latter suspensions: one or more nitrogen containing compounds such as urea, ammonium nitrate, and aqua ammonia; and one or more potassium containing compounds such as potassium chloride and potassium sulfate. The supplementary nitrogen containing compounds may be added as concentrated aqueous solutions. The potassium containing compounds are preferably added as fine particle size solids. Thus the preferred suspension fertilizers contain: a nitrogen containing compound selected from the group consisting of $NH_4H_2PO_4$, $(NH_4)_2HPO_4$, $NH_4Cl$, $NH_4NO_3$, $KNO_3$, urea, and mixtures thereof; a phosphorus containing compound selected from the group consisting of $NH_4H_2PO_4$, $(NH_4)_2HPO_4$, $KH_2PO_4$, $K_2HPO_4$, and mixtures thereof; and a potassium containing compound selected from the group consisting of $KCl$, $KNO_3$, $KH_2PO_4$, $K_2HPO_4$, $K_2SO_4$, and mixtures thereof.

The invention will be illustrated by the following nonlimiting examples.

EXAMPLE 1

An aqueous slurry containing 550 grams of water and the number of grams of Wyoming bentonite (AQUA-GEL ®) or leonardite (CARBONOX ®) and concentrated ammonium hydroxide indicated in Table 1 was prepared by mixing in a Waring Blendor for one minute. The ammonium hydroxide reacts with the humic acid in the leonardite to form ammonium humate. This slurry was then placed in a reaction vessel equipped with a mixer and a sparge ring on the bottom for admitting ammonia. Thereafter 1407 grams of wet-process phosphoric acid containing 54% $P_2O_5$ was added to the reaction vessel with the mixer in operation. 304 grams of ammonia were then fed into the reaction vessel while maintaining agitation until the pH reached 6.5. The mixture was then placed in a jar, sealed, and allowed to cool slowly to room temperature (72° F).

After 24 hours the suspension fertilizer test mixtures prepared were examined for: the relative amount of crystals present and their largest size; the percent separation in the suspension as indicated by the volume % of clear liquid on top of the suspension; the percent settling in the suspension as indicated by the volume % of packed sediment, including crystals, on the bottom of the container; and the rheological properties of the suspensions after hand shaking. The suspension fertilizers were than stored at room temperature for the number of days indicated in Table 2 and again evaluated. The rheological properties were obtained using a Fann rotational viscometer (for a description see the book entitled "Viscosity and Flow Measurement," J. R. Van Wazer, J. W. Lyons, K. Y. Kim, and R. E. Colwell, Interscience Publishers, Div. John Wiley & Sons, New York N.Y., 1963, ppg. 156–161) and the established procedure set forth in the American Petroleum Institute publication, API RP-13B, Fourth Edition, November 1972. The data obtained are given in Table 1.

TABLE 1

| Test No. | 1 | 2 | 3 |
|---|---|---|---|
| Bentonite, gm. | 40 | 30 | 0 |
| Leonardite, gm. | 0 | 0 | 40 |
| NH₄OH, gm. | 0 | 0 | 5 |
| Crystal Growth, amount | few | many | none |
| Crystal Growth, size, in. | 1/2 | 1/16 | 0 |
| Settling % | 0 | 10 | 0 |
| Separation, % | 0 | 0 | 0 |
| Apparent Viscosity, cp. | 87 | 103.5 | 56 |
| Plastic Viscosity, cp. | 76 | 87 | 48 |
| Yield Point, lb./100 sq. ft. | 22 | 33 | 16 |
| 10-Sec. Gel., lb./100 sq. ft. | 5 | 18 | 5 |
| 10-Min. Gel., lb./100 sq. ft. | 12 | 22 | 7 |
| Days Stored at R.T. | 68 | 67 | 63 |
| Crystal Growth, size, in. | 1 | 1/32 | 1/64 |
| Settling, % | 18 | 25 | 5 |
| Separation, % | 0 | 34 | 3 |
| Apparent Viscosity, cp. | * | — | 69.5 |
| Plastic Viscosity, cp. | * | — | 59 |
| Yield Point, lb./100 sq. ft. | * | — | 21 |
| 10-Sec. Gel., lb./100 sq. ft. | * | — | 3 |

*Crystals too large for Fann rheological data.

EXAMPLE 2

An aqueous slurry containing 550 grams of water and the number of grams of Wyoming bentonite, either leonardite or Tennessee lignite, and concentrated ammonium hydroxide indicated in Table 2 was prepared by mixing these materials together in a Waring Blendor for one minute as in Example 1. The slurry was then placed in the reaction vessel described in Example 1. For suspension fertilizer test mixtures 5, 10 and 13, which did not contain any ammonium hydroxide in the clay/leonardite slurry, ammonia was admitted to the reaction vessel while agitating to form ammonium humate in-situ within the reaction vessel. Thereafter 1407 grams of 54% $P_2O_5$ wet-process phosphoric acid and ammonia were continuously fed into the reaction vessel, while mixing, at a rate sufficient to maintain the pH at the value indicated in Table 2. Ammonia was then fed into the reactor to raise the pH to the final value indicated in Table 2. The suspension fertilizer test mixtures were then cooled slowly to room temperature. Suspension fertilizers designated with a "C" were cooled rapidly to 140° F and thereafter allowed to cool slowly to room temperature. The suspension fertilizers were evaluated as in Example 1.

The suspension fertilizer designated Test No. 7 in Table 2 was placed in an oven at 300° F and dried. This dried fertilizer composition was mixed in a Waring Blendor with an amount of water sufficient to replace the water removed upon drying. A stable suspension fertilizer resulted in which potash (KCl) was admixed to produce a high nitrogen, phosphorus, potassium suspension fertilizer containing 30% $K_2O$ which had excellent flow properties. Thus the novel suspension fertilizer compositions of this invention may be dried at temperatures up to about 400° F, and the dried fertilizer compositions may be used to form stable suspension fertilizers by shearing in water. This is very advantageous where the transportation of the suspension fertilizers is expensive.

TABLE 2

| Test No. | 4 | 4C | 5 | 5C | 6 | 6C | 7 | 8 | 8C |
|---|---|---|---|---|---|---|---|---|---|
| Bentonite, gm. | 30 | 30 | 30 | 30 | 24 | 24 | 20 | 16 | 16 |
| Leonardite, gm. | 10 | 10 | 10 | 10 | 16 | 16 | 20 | 24 | 24 |
| NH₄OH, gm. | 2 | 0 | 0 | 0 | 2 | 0 | 5 | 2 | 0 |
| Ammoniation pH-Initial | 3–4 | | 3–4 | | 3–4 | | 1.0 | 3–4 | |
| Ammoniation pH-final | 4.5 | | 6.5 | | 6.5 | | 6.5 | 6.5 | |
| Crystal Growth, amount | few | few | none | none | several | many | v. few | none | many |
| Crystal Growth, size, in. | 1/64 | 1/4 | 0 | 0 | 1 | 1/32 | 1/64 | 0 | 1/16 |
| Settling, % | 0 | 0 | 0 | 0 | 0 | 0 | 0 | 0 | 0 |
| Separation, % | 0 | 0 | 0 | 0 | 0 | 0 | 0 | 0 | 0 |
| Apparent Viscosity, cp. | 68.5 | 51 | 73 | 64.5 | — | /5 | 78 | 52 | 63 |
| Plastic Viscosity, cp. | 50 | 41 | 58 | 53 | — | 55 | 55 | 42 | 56 |
| Yield Point, lb/100 sq. ft. | 37 | 20 | 30 | 23 | — | 40 | 46 | 20 | 14 |
| 10-Sec. Gel., lb/100 sq. ft. | 6 | 5 | 6 | 5 | — | 11 | 16 | 5 | 9 |
| 10-Min. Gel., lb/100 sq. ft. | 9 | 7 | 8 | 8 | — | 15 | 12 | 8 | 12 |
| Days Stored at R.T. | 56 | 56 | 68 | 68 | 57 | 57 | — | 61 | 61 |
| Crystal Growth, size, in. | 1/64 | 1/64 | 1/16 | 1/64 | 3/4 | 1/32 | — | 1/64 | 1/32 |
| Settling, % | 0 | 0 | 0 | 10 | 0 | 0 | — | 0 | 0 |
| Separation, % | 12 | 20 | 50 | 0 | 10 | 20 | — | 30 | 20 |
| Apparent Viscosity, cp. | 70 | 54.5 | 65 | 52.5 | — | 70 | — | 47.5 | 55 |
| Plastic Viscosity, cp. | 44 | 42 | 55 | 30 | — | 45 | — | 43 | 45 |
| Yield Point, lb/100 sq. ft. | 52 | 25 | 25 | 45 | — | 50 | — | 9 | 20 |
| 10-Sec. Gel., lb/100 sq. ft. | 11 | 6 | — | 11 | — | 11 | — | 2 | 4 |

| Test No. | 9 | 9C | 10 | 10C | 11 | 11C | 12 | 13 | 13C |
|---|---|---|---|---|---|---|---|---|---|
| Bentonite, gm. | 16 | 16 | 16 | 16 (1) | | | 10 | 10 | |
| Leonardite, gm. | 24 | 24 | 24 | | 24 | | 30 | 30 | |
| NH₄OH, gm | 2 | 0 | 0 | | 2 | | 5 | 0 | |
| Ammoniation pH-initial | 3–4 | | 6–6.5 | | 3–4 | | 3–4.5 | 6–6.5 | |
| Ammoniation pH-final | 6.5 | | 6.5 | | 6.5 | | 6.5 | 6.5 | |
| Crystal Growth, amount | few | few | few | few | few | several | med. | none | none |
| Crystal Growth, size, in. | 1/64 | 1/64 | 1/64 | 1/64 | 1/16 | 1 | 1/16 | 0 | 0 |
| Settling, % | 0 | 0 | 0 | 0 | 2 | 10 | 4 | 0 | 0 |
| Separation, % | 0 | 0 | 0 | 0 | 0 | 0 | 0 | 0 | 0 |
| Apparent Viscosity, cp. | 49 | 41 | 41 | 45.5 | 57.5 | — | 43.5 | 27.5 | 30.5 |
| Plastic Viscosity, cp. | 41 | 35 | 44 | 43 | 45 | — | 39 | 26 | 28 |
| Yield Point, lb/100 sq. ft. | 16 | 12 | 4 | 5 | 25 | — | 9 | 3 | 5 |
| 10-Sec. Gel., lb/100 sq. ft. | 5 | 5 | 3 | 4 | 4 | — | 4 | 3 | 4 |
| 10-Min. Gel., lb/100 sq. ft. | 7 | 7 | 16 | 7 | 7 | — | 8 | 6 | 5 |
| Days Stored at R.T. | 50 | 50 | 50 | 50 | 61 | 61 | 63 | 49 | 49 |
| Crystal Growth, size, in. | 1/64 | 1/64 | 1/64 | 1/64 | 1/64 | 3/4 | 1/64 | 1/64 | 1/64 |
| Settling, % | 0 | 0 | 5 | 0 | 0 | 0 | 0 | 0 | 0 |
| Separation, % | 25 | 33 | 15 | 20 | 34 | 12 | 25 | 33 | 40 |
| Apparent Viscosity, cp. | 48.5 | 38.5 | 46 | 46.5 | 66.5 | — | 39 | 27.5 | 26 |
| Plastic Viscosity, cp. | 38 | 33 | 44 | 45 | 49 | — | 36 | 27 | 24 |
| Yield Point, lb/100 sq. ft. | 21 | 11 | 4 | 4 | 35 | — | 6 | 1 | 4 |

TABLE 2-continued

| 10-Sec. Gel., lb/100 sq. ft. | 4 | 3 | 3 | 3 | 7 | — | 4 | 3 | 2 |

(1)Tennessee Lignite

EXAMPLE 3

An aqueous slurry containing 200 grams of water, 40 grams of leonardite, and 4 grams of concentrated ammonium hydroxide was prepared by mixing in a Waring Blendor for one minute. Thirty milliliters of this ammonium humate slurry were added to the reaction vessel of Example 1 containing 350 ml. of water and 200 ml. of the wet-process phosphoric acid (54% $P_2O_5$) while mixing. Ammonia was admitted to the reaction vessel to raise the pH to 4.5. The remainder of the ammonium humate slurry was then added. The remainder of the acid (total 1407 grams) and ammonia were continuously fed into the reactor at a controlled rate sufficient to maintain the pH at 4.5. This mixture was maintained at a temperature of 180° F to 200° F for 20 minutes before adding $NH_3$ to raise the pH to 6.5. This suspension fertilizer test mixture was then cooled slowly to room temperature and tested as in Example 1. This suspension contained no crystals after 24 hours and 1/64 inch crystals after 68 days. The data obtained are given in Table 3.

EXAMPLE 4

An aqueous ammonium humate slurry was prepared by mixing 200 grams of water, 20 grams of leonardite, and 2 grams of concentrated ammonium hydroxide together in a Waring Blendor for one minute. This was mixed into 1407 grams of 54% $P_2O_5$ wet-process phosphoric acid in the reaction vessel of Example 1. Ammonia was fed into the reaction vessel while mixing to raise the pH to 6.5. After the mixture had cooled to 200° F an aqueous slurry containing 20 grams of Wyoming bentonite in 350 grams of water was mixed into the mixture to produce the desired suspension fertilizer. One-half of this suspension fertilizer was cooled slowly to room temperature. The remainder of the suspension fertilizer was cooled rapidly to 140° F and thereafter allowed to cool slowly to room temperature. These mixtures were then tested as in Example 2. No crystals were present and no settling or separation occured in either of these suspensions within 24 hours. Crystals having a size less than 1/16 inch with almost no settling and separation were present after 54 days. The data obtained are given in Table 3. This suspension contains 12% N and 38% $P_2O_5$.

EXAMPLE 5

Ammonia was admitted into the reaction vessel containing 1407 grams of 54% $P_2O_5$ wet-process phosphoric acid and 250 grams water, while mixing, until a pH of 4.0 was obtained. The mixture became very viscous and 300 grams of water were added. The mixture remained viscous. A slurry containing 20 grams of leonardite, 20 grams of Wyoming bentonite, and 2 grams of concentrated ammonium hydroxide in 300 grams of water was added and the mixture ammoniated to a final pH of 6.5. This fertilizer suspension was poured into two containers, cooled and tested as in Example 4. No crystals were present, and no settling or separation occurred in either of these suspensions within 24 hours. The data obtained are given in Table 3. This suspension contains 11.2% N and 35.4% $P_2O_5$.

EXAMPLE 6

In the reaction vessel 1407 grams of 54% $P_2O_5$ wet-process phosphoric acid and 550 grams of water were mixed together. A dry blend containing 20 grams of Wyoming bentonite and 20 grams of lignite were added while mixing. Thereafter ammonia was sparged into the reaction vessel to raise the pH to 6.5. This fertilizer suspension was poured into two containers, cooled and tested as in Example 4. No crystals were present in the suspension within 24 hours. The data obtained are given in Table 3.

EXAMPLE 7

The procedure of Example 6 was conducted except that no Wyoming bentonite or humic acid was added to the suspension. The suspension was cooled slowly to room temperature and tested as in Example 1. Many crystals were present as large as 1 inch in length. The data obtained are given in Table 3. This suspension contains 12% N and 38% $P_2O_5$.

TABLE 3

| Test No. | Example 3 14 | Example 4 15 | 15C | Example 5 16 | 16C | Example 6 17 | 17C | Example 7 18 |
|---|---|---|---|---|---|---|---|---|
| Bentonite, gm. | 0 | 20 | | 20 | | 20 | | 0 |
| Leonardite, gm. | 40 | 20 | | 20 | | 20 | | 0 |
| NH₄OH, gm. | 4 | 2 | | 2 | | 0 | | 0 |
| Crystal Growth, amount | none | none | none | none | none | none | none | many |
| Crystal Growth, size, in. | 0 | 0 | 0 | 0 | 0 | 0 | 0 | 1 |
| Settling, % | 12 | 0 | 0 | 0 | 0 | 2 | 2 | 50 |
| Separation, % | 0 | 0 | 0 | 0 | 0 | 13 | 18 | 50 |
| Apparent Viscosity, cp. | 51.5 | 97 | 75 | 63.5 | 64.5 | 33 | 27 | (1) |
| Plastic Viscosity, cp. | 50 | 87 | 69 | 51 | 50 | 32 | 27 | (1) |
| Yield Point, lb/100 sq. ft. | 3 | 20 | 12 | 25 | 25 | 2 | 0 | (1) |
| 10-Sec. Gel., lb/100 sq. ft. | 2 | 3 | 3 | 2 | 3 | 3 | 3 | (1) |
| 10-Min. Gel., lb/100 sq. ft. | 2 | 5 | 4 | 0 | 11 | 6 | — | (1) |
| Days stored at R.T. | 68 | 54 | 54 | 61 | 61 | 62 | 62 | 67 |
| Crystal Growth, size, in. | 1/64 | 1/64 | 1/64 | 1/16 | 1/4 | 1/64 | 1/64 | 1/2 |
| Settling, % | 30 | 0 | 0 | 0 | 0 | 50 | 45 | 66 |
| Separation, % | 30 | 1 | 2 | 6 | 5 | 50 | 55 | 34 |
| Apparent Viscosity, cp. | 60 | 108 | 84 | — | — | 30 | 24 | (1) |
| Plastic Viscosity, cp. | 56 | 95 | 70 | — | — | 30 | 23 | (1) |
| Yield Point, lb/100 sq. ft. | 8 | 26 | 28 | — | — | 0 | 2 | (1) |
| 10-Sec. Gel., lb/100 sq. ft. | 4 | 2 | 3 | — | — | 3 | 3 | (1) |

(1)Too many crystals to obtain rheological properties.

EXAMPLE 8

An ammonium humate slurry was prepared in-situ by mixing 2 grams of leonardite with 550 grams of water in the reaction vessel and adding ammonia through the sparger. Thereafter 1407 grams of 54% $P_2O_5$ wet-process phosphoric acid and ammonia were continuously added at a rate to maintain the pH at 3.0–4.0. The pH was then raised to 6.5 with ammonia. The final weight of the suspension fertilizer was adjusted to 2000 grams by the addition of water, poured into two containers, and cooled as in Example 4. After 96 hours at room temperature neither suspension contained any crystals. The suspensions were placed in an oven at 115° F for 24 hours. The suspensions contained a few very small (<1/64 inch) crystals. The suspensions were aged 70 days at room temperature. No crystals could be seen under the microscope (60 ×).

EXAMPLE 9

The procedure of Example 8 was repeated with 2 grams of Tennessee lignite in place of the leonardite. After 96 hours at room temperature neither suspension contained any crystals. The suspensions were placed in an oven at 115° F for 24 hours. The suspensions then contained a few very small (<1/64 inch) crystals. The suspensions were aged 70 days at room temperature and contained a medium number of crystals less than 1/64 inch in length.

EXAMPLE 10

A slurry containing the amount of leonardite indicated in Table 4 in 300 ml. of water containing 4 ml. concentrated ammonium hydroxide was placed in the reactor. Thereafter ammonia and 54% $P_2O_5$ wet-process phosphoric acid were added continuously while mixing at a pH of 6.8 until 1407 grams of acid were added. A slurry containing the amount of Wyoming bentonite indicated in Table 4 in 180 grams of water was added and the weight of the mixture was adjusted to 2000 grams. The samples were cooled rapidly to 140° F and thereafter allowed to cool to room temperature. After 24 hours the suspensions were inspected for crystal growth. The data obtained are given in Table 4.

TABLE 4

| Test No. | 19 | 20 | 21 | 22 | 23 | 24 |
|---|---|---|---|---|---|---|
| Leonardite, gm. | 40 | 40 | 40 | 10 | 20 | 0 |
| Bentonite, gm. | 2 | 5 | 10 | 20 | 0 | 20 |
| Settling, % | 0 | 0 | 0 | 0 | 0 | 75 |
| Crystal Size, in. | 1/64 | 1/64 | 1/64 | 1/64 | none[2] | 1/16 |
| Viscosity, cp.[1] | 5400 | 1048 | 4450 | — | 715 | — |

[1]Brookfield RVT Viscometer at 100 rpm.
[2]Contained less than 1/64 in. diammonium phosphate crystals after 72 hours.

EXAMPLE 11

A slurry containing 15 grams leonardite and 15 grams Wyoming bentonite in 550 milliliters of water containing 4 milliliters of concentrated ammonium hydroxide was placed in the reactor. Thereafter ammonia and 54% $P_2O_5$ wet-process phosphoric acid were added while mixing at a pH of 6.8 until 1407 grams of acid were added. The weight of the mixture was adjusted to 2000 grams to produce a suspension fertilizer containing 12% nitrogen and 38% $P_2O_5$. The sample was quickly cooled to 140° F and thereafter allowed to cool to room temperature. After 24 hours the sample exhibited no settling and contained 1/16 – 1/32 inch diammonium phosphate crystals. A portion of this suspension fertilizer after cooling to 115° F was adjusted by the addition of KCl to produce a suspension fertilizer containing 10% N, 32% $P_2O_5$, and 10% KCl. After 24 hours the sample exhibited 3% settling and contained diammonium phosphate crystals of less than 1/64 inch size.

EXAMPLE 12

The procedure of Example 11 for preparing a 12% N, 38% $P_2O_5$ suspension fertilizer was followed, except that the initial leonardite-bentonite slurry contained 2 grams potassium hydroxide in place of the ammonium hydroxide. After 24 hours the suspension exhibited no settling and contained 1/64 inch diammonium phosphate crystals. A portion of this suspension after cooling to 115° F was adjusted with KCl to produce a suspension fertilizer containing 7.6% N, 24% $P_2O_5$, and 20% KCl. After 24 hours at room temperature the sample was a good suspension which exhibited no settling and which contained diammoniumphosphate crystals of less than 1/64 inch size and KCl crystals.

EXAMPLE 13

An aqueous slurry containing 1050 grams of water, 20 grams of leonardite and 2 grams of concentrated ammonium hydroxide was prepared by mixing in a Waring Blendor for one minute. This was added to the reactor followed by the continuous addition, while mixing and maintaining the pH at 6.8, of ammonia and 84% $P_2O_5$ polyphosphoric acid until a total of 904 grams of the acid was added. The final weight of the mixture was adjusted to 2000 grams. One-half of this mixture was cooled slowly to room temperature and the remainder was cooled rapidly to 140° F and thereafter allowed to cool slowly to room temperature. These mixtures were then evaluated as before after 24 hours. No crystals, no settling and no separation occurred in either mixture.

As exemplified hereinbefore, the addition of humic acid, preferably in the form of a soluble humate salt, to suspension fertilizers allows the manufacturing of suspension fertilizers in a one reactor continuous process without the need for the rapid cooling step and second reactor necessary in prior art processes. This is a distinct economic advantage over prior processes. Moreover, the suspension fertilizers containing humic acid have enhanced stability over prior suspension fertilizers.

Although prior art patents have disclosed the use of bentonite clay in suspension fertilizers, in actual practice no use of bentonite has been made. This is because it has been found that the clay must be incorporated into the fertilizer suspension after it has cooled to about 140° F and that the bentonite clay must be pre-hydrated in water before addition to the suspension fertilizer. Addition of pre-hydrated bentonite adds a considerable amount of water thus undesirably reducing the concentration of plant nutrients in the suspension. In contrast to bentonite, attapulgite clay can be added dry to the cooled suspension fertilizer. Thus another distinct advantage of adding humic acid to suspension fertilizers is that it enables bentonite clay to be used as a suspending agent since it allows pre-hydrated bentonite to be added to the cooled base suspension fertilizer (since the base suspension fertilizer may contain higher concentrations of plant nutrients at the time of addition of the bentonite) and since it allows the pre-hydrated bentonite to be added at elevated temperatures as a slurry in the water normally added to the reactor.

While the suspension fertilizers of this invention contain as essential ingredients water, humic acid, and a high concentration in excess of its solubility of at least one highly soluble primary plant food, and preferably bentonite clay, the fertilizers may also contain other soluble plant food material, such as trace elements and secondary plant food material. Optionally the suspension fertilizers may contain finely divided (i.e., minus 100 mesh) particles of plant food material, impurities, herbicide, pesticide, etc., present in excess of their solubility in the concentrated fertilizer solution.

Since the humic acid functions as a crystallization inhibitor, the incorporation of humic acid into a solution of at least one fertilizer chemical allows the solution to be concentrated to greater nutrient values (higher concentrations of N, $P_2O_5$, and $K_2O$) while remaining a clear solution (although colored with the humic acid) than is possible without the humic acid being present, i.e., the humic acid enables the production of supersaturated solutions of the fertilizer chemical. Thus the term "suspension fertilizer" for the purposes of the invention disclosed and claimed herein is intended to include not only saturated solutions of at least one fertilizer chemical in which part of the total chemical nutrients are present as minute, finely divided crystals, but is also intended to include supersaturated solutions of at least one fertilizer chemical. Processes for producing solution fertilizers are disclosed in the following U.S. Patents, incorporated herein by reference: U.S. Pat. Nos. 2,950,961; 3,015,552; 3,264,087; 3,347,656.

The solubility of chemical nutrients is the major consideration in the production of liquid fertilizer solutions such as the standard 8-24-0 grade produced by ammoniating phosphoric acid. If the salt concentration is too high, crystallization (commonly called "salting out") may occur during storage or transport, and the resulting crystals may clog transfer or application equipment. The concentration is kept as high as possible to reduce shipping and handling cost. The incorporation of humic acid into such liquid fertilizer solutions will prevent or delay the formation of such crystals.

I claim:

1. In a method for producing a suspension fertilizer which includes saturating an aqueous phase with at least one phosphate containing fertilizer chemical and thereafter causing said saturated aqueous phase to become supersaturated from which phosphate crystals may be formed, the improvement which comprises adding before said aqueous phase becomes supersaturated between about 0.05% and about 3% by weight, based on the total weight of said suspension fertilizer of an alkali metal or ammonium salt, or mixtures thereof, of humic acid or a material which contains humic acid selected from the group consisting of leonardite, lignite, marine sediments, and mixtures thereof.

2. The method of claim 1 wherein there is added from 0.1% to 3% by weight of said salt.

3. The method of claim 2 wherein said alkali metal is potassium.

4. The method of claim 3 wherein said salt is added in the form of an aqueous solution.

5. In a method for producing a suspension fertilizer containing from 0.25% to about 3% by weight bentonite which includes reacting ammoniating fluid and phosphoric acid at a first temperature substantially above 50° C, and controlling the water content of said ammoniating fluid and phosphoric acid to effect a supersaturated solution while cooling the resulting liquid, the improvement which comprises adding to said solution before cooling between about 0.05% and about 3% by weight humic acid, based on the total weight of said suspension fertilizer.

6. The method of claim 5 wherein said suspension fertilizer contains from 0.25% to about 2% by weight bentonite and from 0.1% to about 3% by weight of an alkali metal or ammonium salt, or mixtures thereof, of humic acid or a material which contains humic acid selected from the group consisting of leonardite, lignite, marine sediments, and mixtures thereof.

7. The method of claim 6 wherein said alkali metal is potassium and wherein said salt is added to the reaction vessel in the form of an aqueous solution.

8. The method of claim 7 wherein said ammoniating liquid and said phosphoric acid are added concurrently.

9. The method of claim 7 wherein said bentonite is added after all of the desired amount of said ammoniating fluid and said phosphoric acid have reacted.

10. The method of claim 8 wherein said bentonite is added after all of the desired amount of said ammoniating fluid and said phosphoric acid have reacted.

11. The method of claim 5 wherein said humic acid is present in the reaction vessel in the form of an aqueous slurry, and wherein said aqueous slurry is reacted with said ammoniating fluid to produce a solution of ammonium humate in-situ within the reaction vessel before addition of phosphoric acid.

12. The method of claim 11 wherein said bentonite is added after all of the desired amount of said ammoniating fluid and said phosphoric acid have reacted.

13. The method of claim 5 wherein said humic acid is added to the reaction vessel before all of the desired amount of said ammoniating fluid and said phosphoric acid have reacted.

14. The method of claim 13 wherein said humic acid is added in the form of an aqueous solution of potassium humate or ammonium humate.

15. The method of claim 14 wherein said bentonite is added after all of the desired amount of said ammoniating fluid and said phosphoric acid have reacted.

16. A method of inhibiting the formation and growth of phosphate crystals from a supersaturated solution of a fertilizer chemical containing at least nitrogen, and phosphorous which comprises adding to said solution from 0.05% to 3% by weight of an alkali metal or ammonium salt of humic acid or a material which contains humic acid selected from the group consisting of leonardite, lignite, marine sediments, and mixtures thereof, before said solution becomes supersaturated.

17. The method of claim 16 wherein there is added from 0.1% to 3% by weight of said salt.

18. The method of claim 17 wherein said alkali metal is potassium and wherein said salt is added in the form of an aqueous solution.

19. The method of inhibiting the formation and growth of crystals from a supersaturated solution of at least one fertilizer chemical and of preventing the settling of any crystals which are formed from said solution, which comprises adding to said solution from 0.05% to 3% by weight of an alkali metal or ammonium salt, or mixtures thereof, of humic acid or a material which contains humic acid selected from the group consisting of leonardite, lignite, marine sediments, and mixtures thereof, before said solution becomes supersaturated and from 0.25% to 3% by weight bentonite.

20. The method of claim 19 wherein there is added from 0.1% to 3% by weight of said salt and from 0.25% to 2% by weight bentonite.

21. The method of claim 19 wherein said alkali metal is potassium and wherein said salt is added in the form of an aqueous solution.

22. The method of claim 21 wherein said bentonite is added after said solution becomes supersaturated.

23. A high analysis suspension-type fertilizer having plant-food content and desirable flow properties which comprises:
 i. water;
 ii. a nitrogen-containing compound to provide at least 10% nitrogen by weight;
 iii. a phosphorous containing compound to provide at least 35% by weight $P_2O_5$; and
 iv. 0.05% to 3% by weight of a material selected from the group consisting of humic acid, leonardite, lignite, marine sediments, and the alkali metal and ammonium salts thereof;
wherein said concentrations are based on the total weight of said suspension fertilizer.

24. The suspension fertilizer of claim 23 which contains from 0.1% to 3% by weight of said material and from 0.25% to 3% by weight bentonite.

25. A high analysis suspension-type fertilizer having plant-food content and desirable flow properties, which comprises:
 i. water;
 ii. a nitrogen containing compound to provide at least 8% nitrogen by weight;
 iii. a phosphorous containing compound to provide at least 12% by weight $P_2O_5$;
 iv. a potassium compound to provide at least 7% by weight $K_2O$; and
 v. 0.05% to 3% by weight of a material selected from the group consisting of humic acid, leonardite, lignite, marine sediments, and the alkali metal and ammonium salts thereof;
wherein said concentrations are based on the total weight of said suspension fertilizer.

26. The suspension fertilizer of claim 25 which contains from 0.25% to 3% by weight bentonite.

27. The suspension fertilizer of claim 25 which contains from 0.1% to 3% by weight of said material and from 0.25% to 3% by weight bentonite.

28. The suspension fertilizer of claim 25 wherein said nitrogen compound is selected from the group consisting of $NH_4H_2PO_4$, $(NH_4)_2HPO_4$, $NH_4CL$, $NH_4NO_3$, $KNO_3$, urea and mixtures thereof, wherein said phosphorus containing compound is selected from the group consisting of $NH_4H_2PO_4$, $(NH_4)_2HPO_4$, $KH_2PO_4$, $K_2HPO_4$, and mixtures thereof; and wherein said potassium containing compound is selected from the group consisting of $KCl$, $KNO_3$, $KH_2PO_4$, $K_2HPO_4$, and mixtures thereof.

29. The suspension fertilizer of claim 28 which contains from 0.1% to 3% by weight of said material and from 0.25% to 3% by weight of bentonite.

30. The method of claim 1 which comprises the additional step of drying said suspension fertilizer at a temperature up to about 400° F.

31. The solid fertilizer composition useful in preparing stable suspension fertilizer compositions by shearing said solid fertilizer composition in water which comprises the dried product obtained in claim 30.

32. The method of claim 5 which comprises the additional step of drying said suspension fertilizer at a temperature up to about 400° F.

33. The solid fertilizer composition useful in preparing stable suspension fertilizer compositions by shearing said solid fertilizer composition in water which comprises the dried product obtained in claim 32.

34. The solid fertilizer composition useful in preparing stable suspension fertilizer compositions by shearing said solid fertilizer composition in water which comprises the solid fertilizer composition which results from removing the water from the suspension fertilizer of claim 23.

35. A process for producing stable suspension fertilizers, which comprises:
 reacting in sufficient amounts a mixture of an ammoniating fluid and wet-process phosphoric acid until the resulting suspension contains at least 10% nitrogen by weight, and at least 35% phosphorous expressed as $P_2O_5$;
 adding to said reaction mixture before it becomes supersaturated from 0.25% to 3% by weight bentonite and 0.05% to 3.0% by weight, based on the total weight of said suspension, of an alkali metal or ammonium salt, or mixture thereof, of humic acid or a material which contains humic acid selected from the group consisting of leonardite, lignite, marine sediments, and mixtures thereof, said bentonite and said salt being dispersed in water before addition to said reaction mixture; and
 adding to said reaction mixture containing bentonite and said salt a sufficient amount of a material selected from a nitrogen-containing compound, and a potassium-containing compound to prepare a suspension fertilizer containing at least 8% nitrogen and at least 12% phosphorous expressed as $P_2O_5$.

36. The process of claim 35 wherein said alkali metal is potassium.

* * * * *